April 10, 1962 — I. L. JOY — 3,028,751
MEANS FOR ULTRASONIC INSPECTION OF RAIL
Filed Dec. 29, 1955 — 9 Sheets-Sheet 1

(a)   (b)   (c)

Inventor
Ivan L. Joy.
By Mann, Brown and McWilliams
Attys

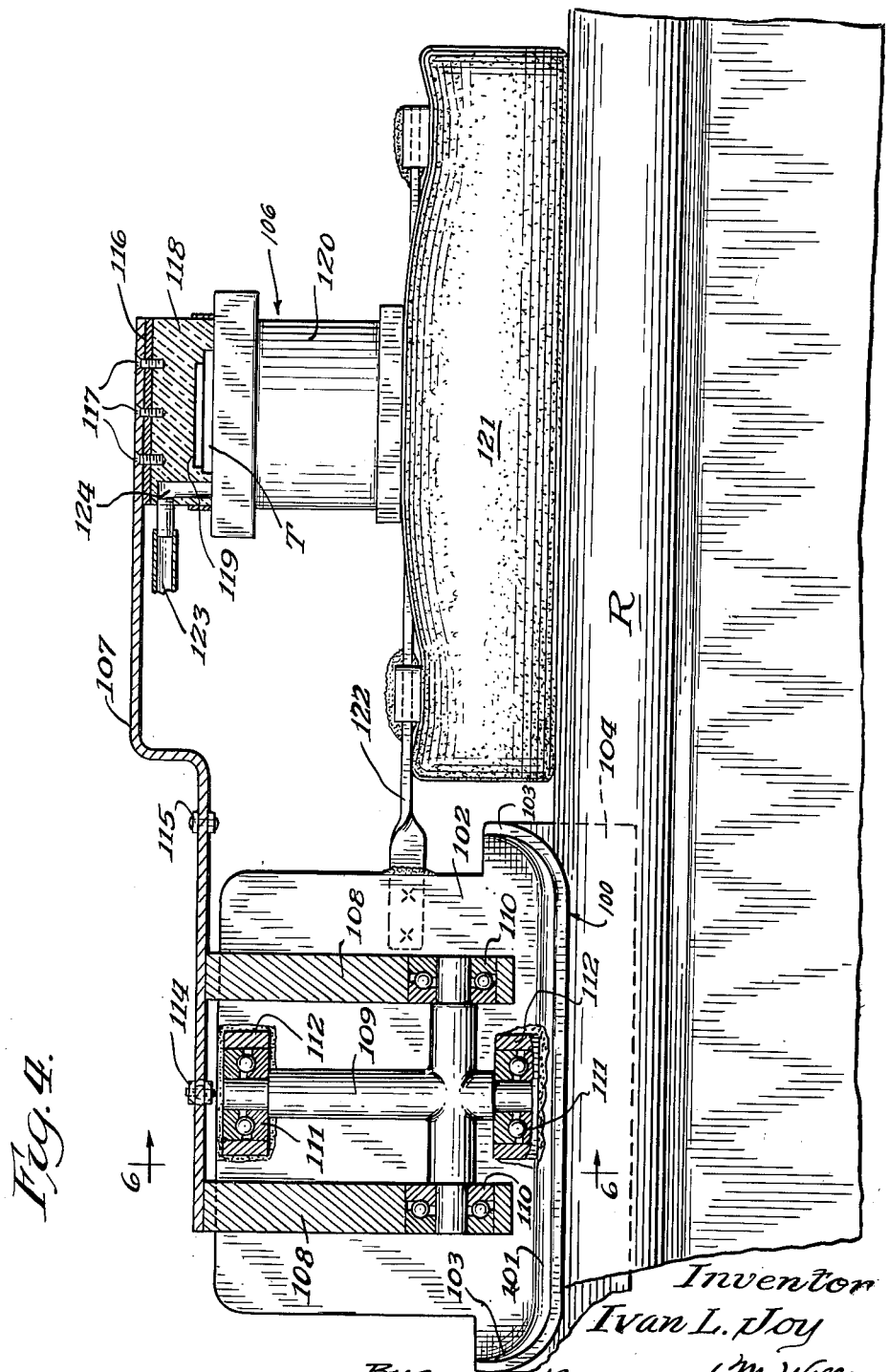

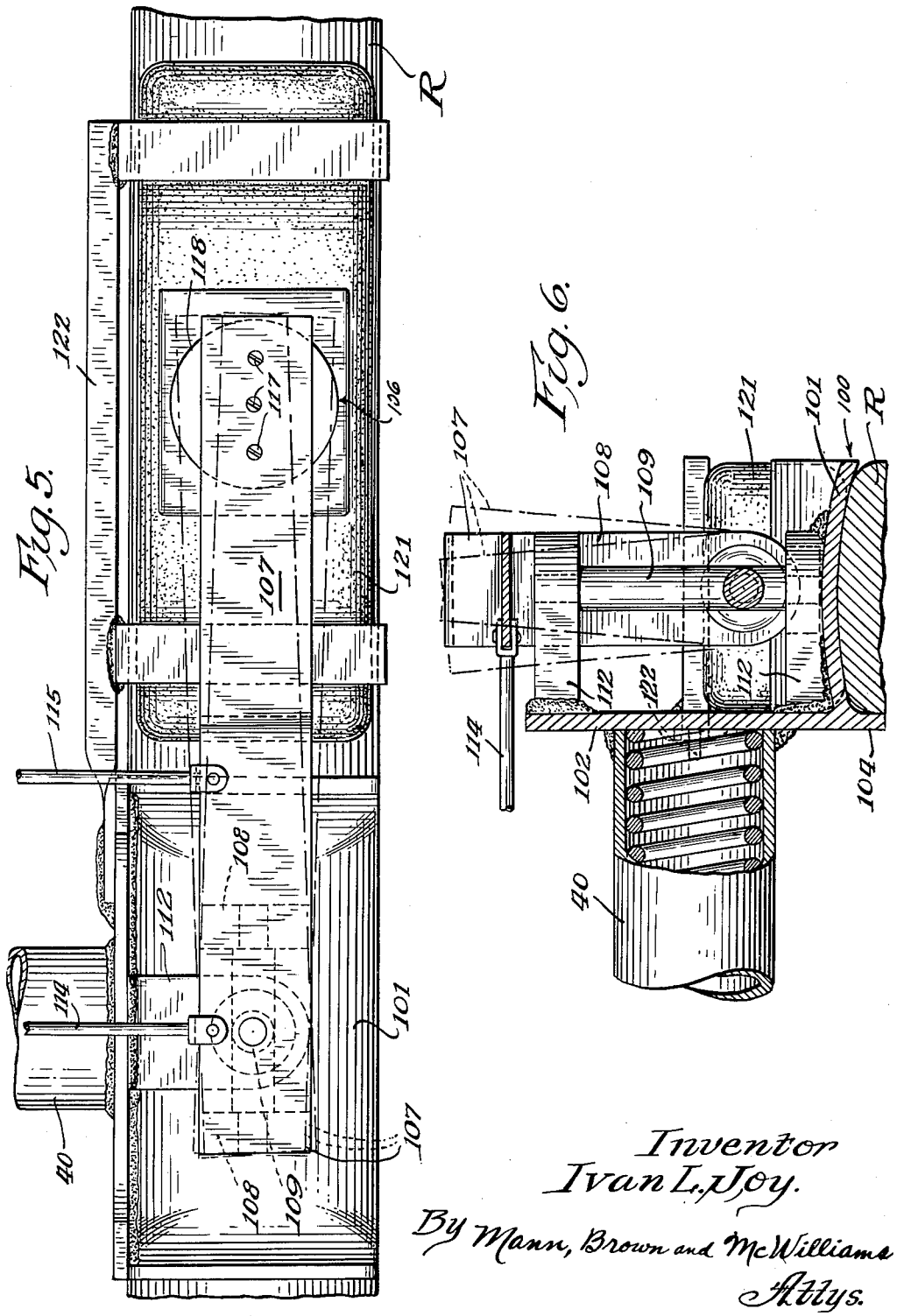

April 10, 1962     I. L. JOY     3,028,751
MEANS FOR ULTRASONIC INSPECTION OF RAIL
Filed Dec. 29, 1955     9 Sheets-Sheet 4
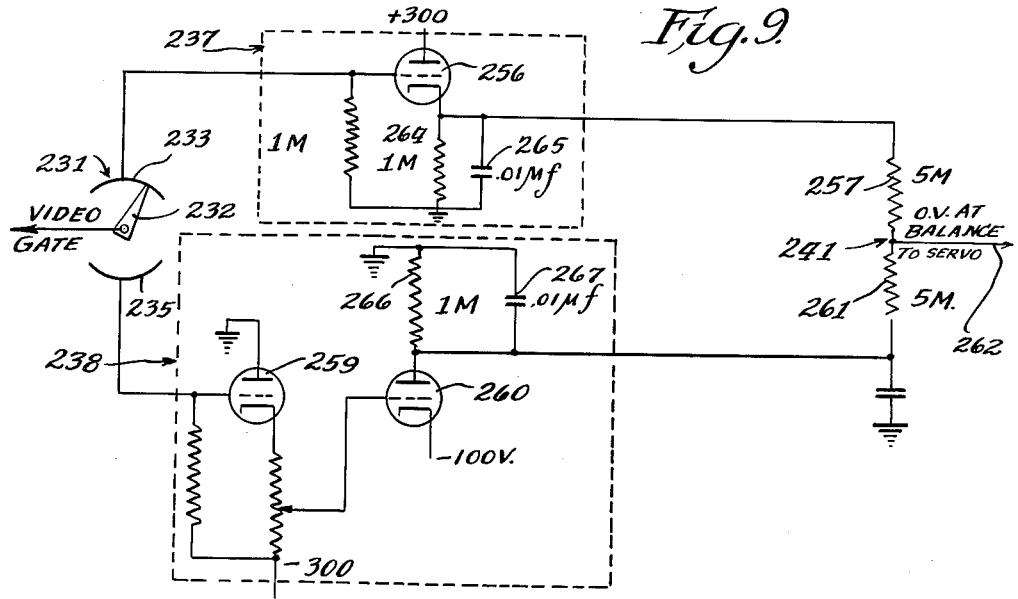
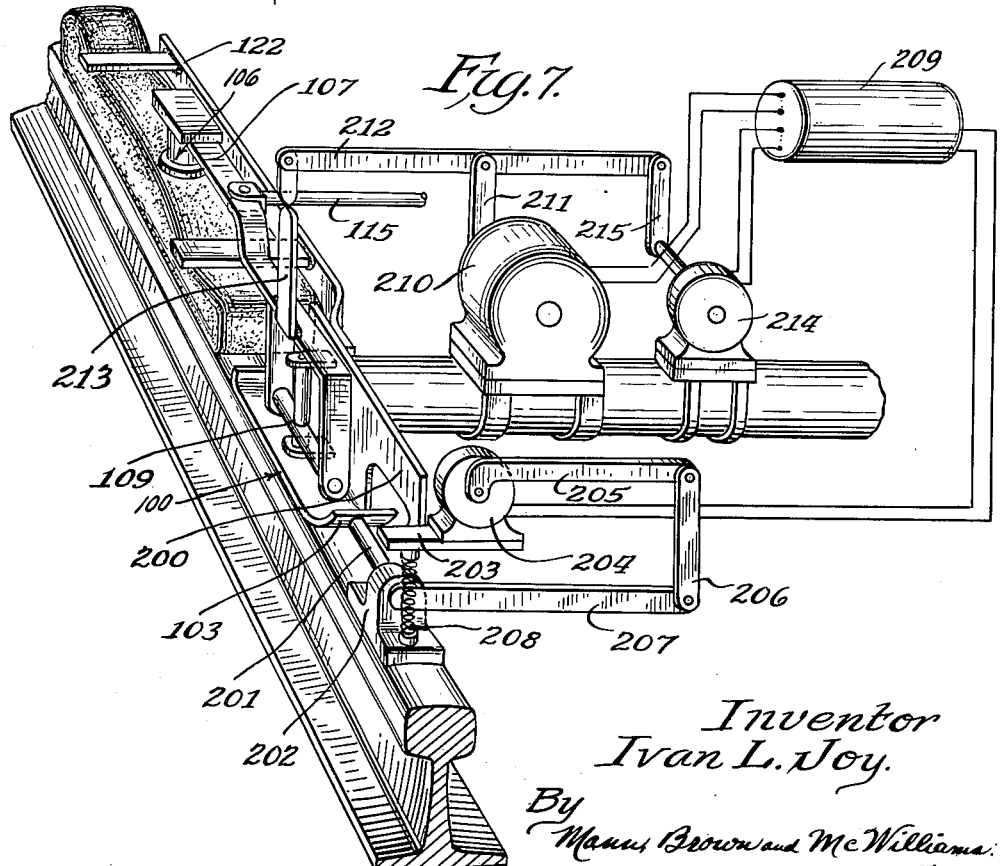
Inventor
Ivan L. Joy.
By
Mann, Brown and McWilliams
Attys

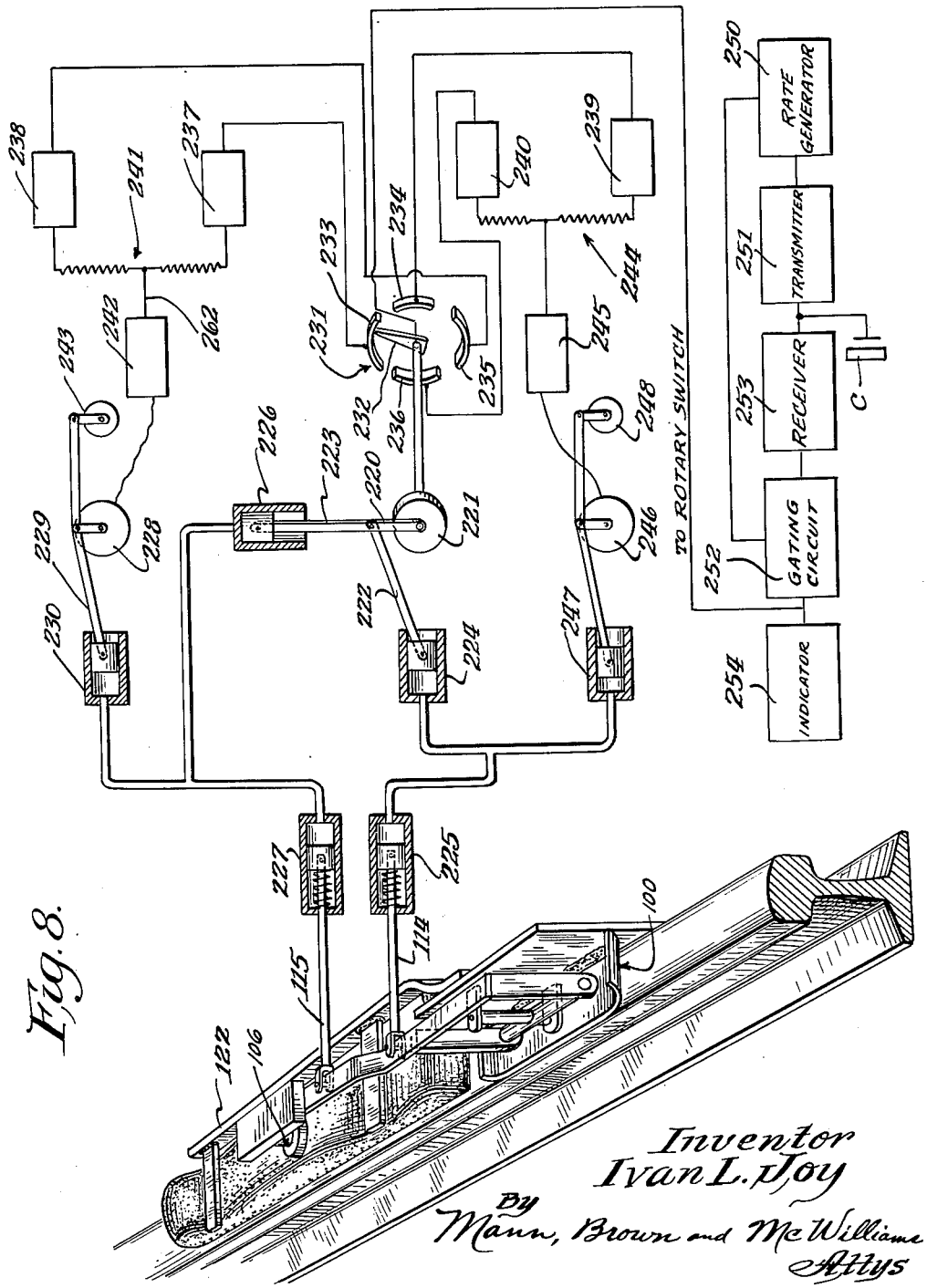

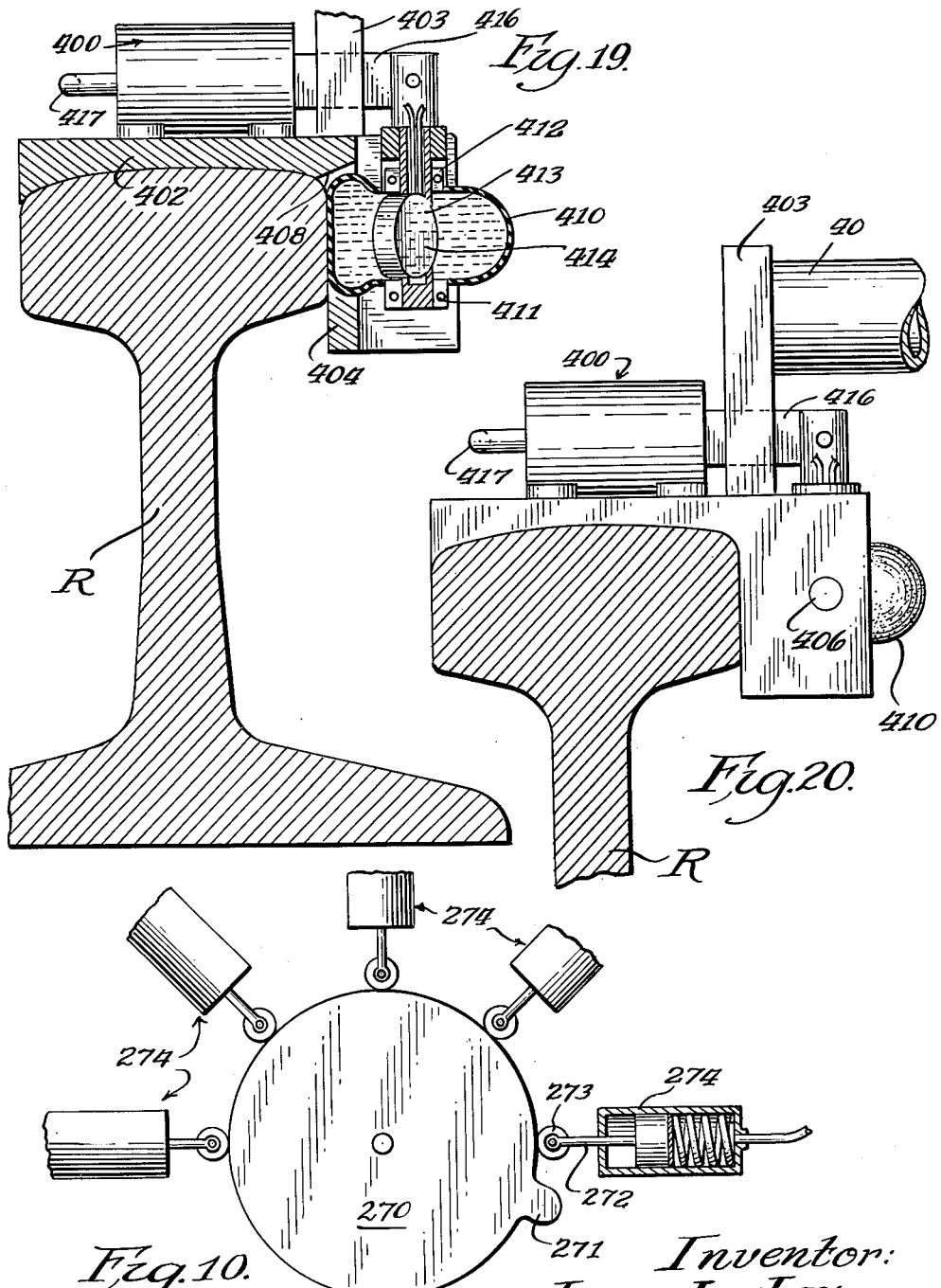

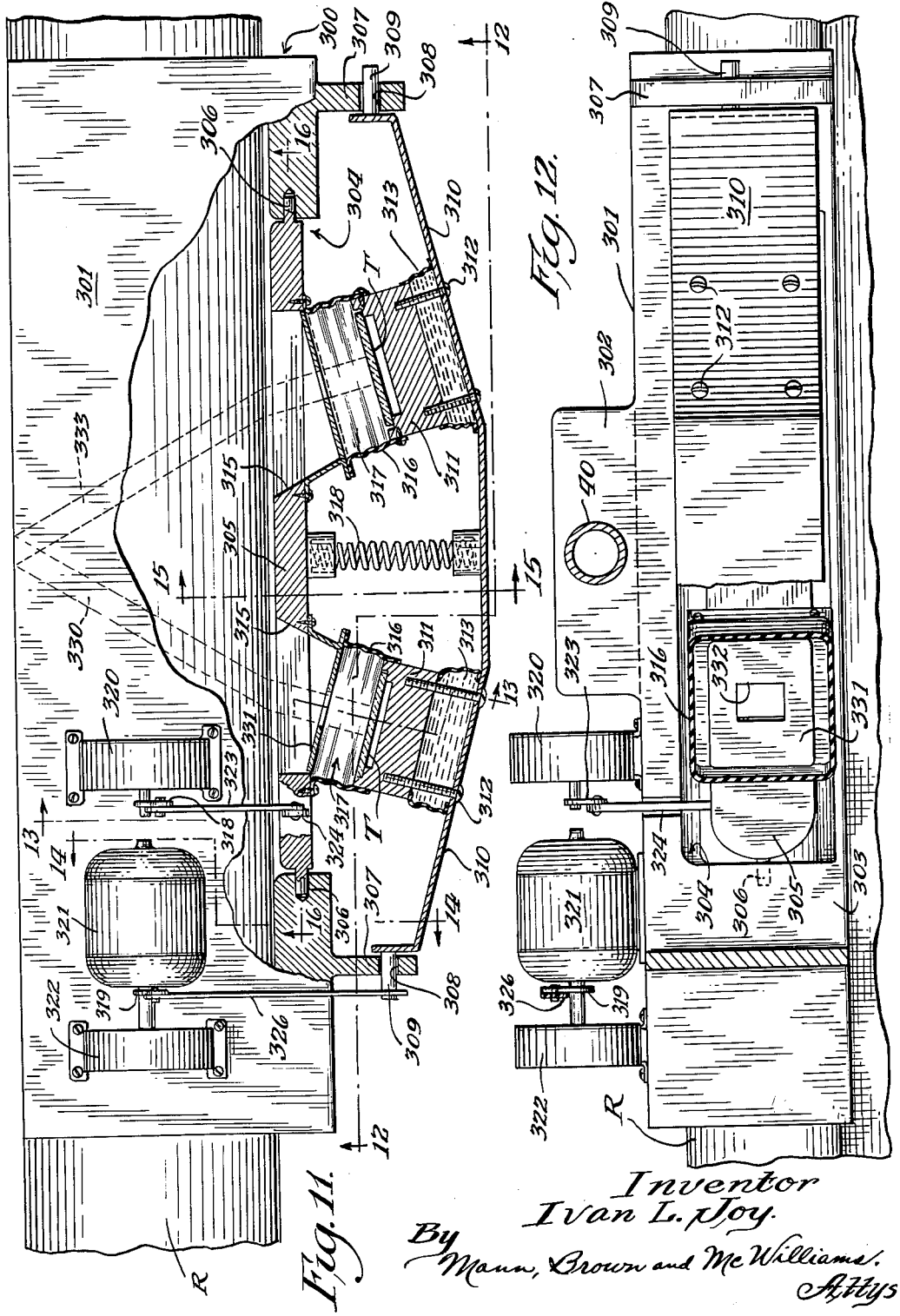

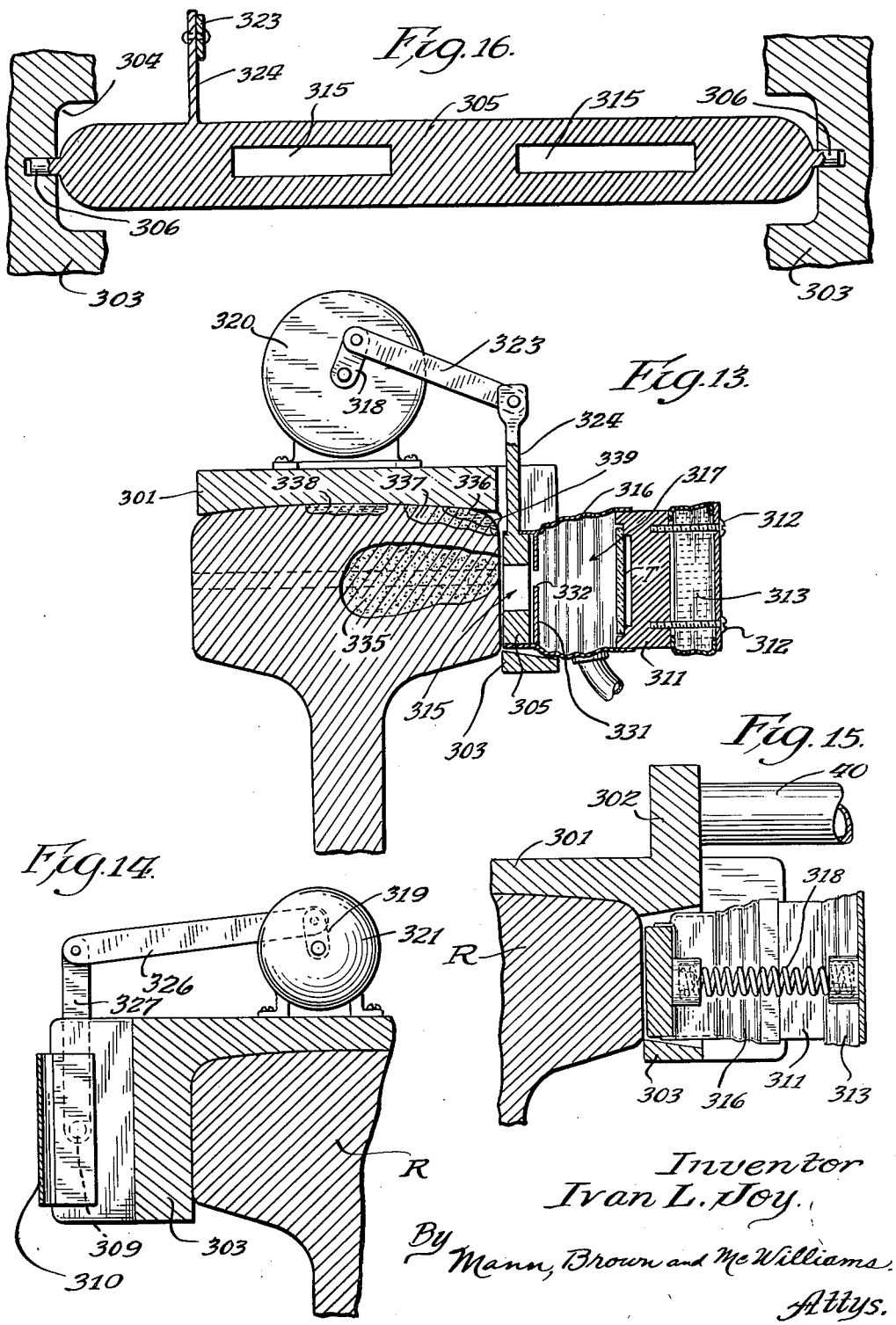

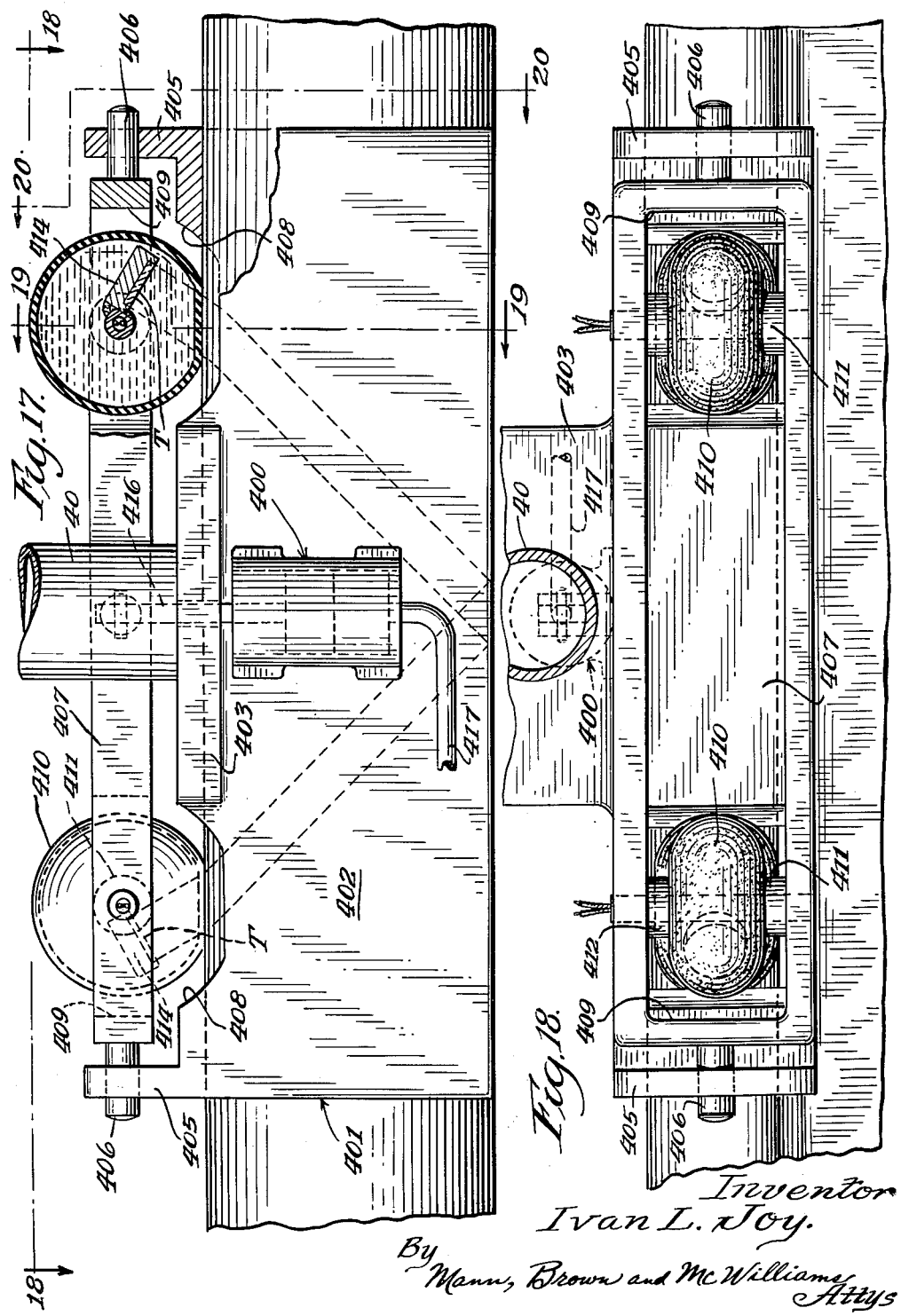

United States Patent Office 3,028,751
Patented Apr. 10, 1962

3,028,751
MEANS FOR ULTRASONIC INSPECTION OF RAIL
Ivan L. Joy, 1616 W. Dudley Road, Topeka, Kans.
Filed Dec. 29, 1955, Ser. No. 556,175
16 Claims. (Cl. 73—67.8)

This invention relates to methods and means for inspecting objects with ultrasonics and more particularly is concerned with the special problems arising from the application of ultrasonics to the progressive testing of successive portions of rail.

In applying utlrasonics to the testing of solid objects it is important that the sender and receiver of the ultrasonic signals be maintained in proper operating relationship with respect to the object under test. A proper operating relationship is achieved when the beam of ultrasound is directed into a region of the body which it is desired to test such that it will emerge from the body and actuate suitable receiving equipment for indicating the condition of the body.

In rail flaw testing with ultrasonics the requirement of maintaining a proper working relationship creates many varied and complex problems of crystal positioning and control. Internal flaws occur throughout the generally T-shaped cross section of a rail but the entire cross section cannot be inspected by a single entering beam. In addition, the flaws in rail may be oriented in any of a plurality of different planes, thus making it extremely difficult to reliably obtain a direct reflection from each and every flaw.

Coupled with the problems presented by the location and orientation of the internal flaws are the equally important problems arising from the constantly changing rail surface contours and the not infrequent rail curvatures. Changing surface contours result in different angles of incidence of the impinging ultrasound and require compensating changes in the orientation of the sender and receiver of the ultrasonic beam in order to maintain a proper working relationship. Rail curvatures cannot be followed with the necessary degree of accuracy by positioning a crystal with any of the prior art carriage and suspension systems and thus result in displacing the crystal laterally relative to the rail thereby interrupting the desired working relationship.

It is the principal object of the invention to provide methods and means for solving the above problems in ultrasonic rail testing and other similar applications.

It is a further object to provide automatic means for accomplishing the above.

Other objects and advantages of the invention will be apparent during the course of the following description.

In the accompanying drawings forming a part of the specifications and in which like numerals are employed to designate like parts throughout the same;

FIGS. 3(a), 3(b), and 3(c) illustrate various arrangements for applying a transducer to the rail to detect internal defects irrespective of their location;

FIG. 4 is an enlarged side view of the carriage for crystal with parts thereof being sectioned;

FIG. 5 is a plan view of the carriage of FIG. 4 and illustrates the lateral pivotal crystal movement which is provided by the carriage;

FIG. 6 is a front sectional view taken in the vertical plane of the line 6—6 of FIG. 4 and illustrates the lateral roll crystal movement which is provided by the carriage;

FIG. 7 is a perspective view showing the carriage applied to a rail and includes a mechanical feeler arrangement and electrical control unit for automatically adjusting the lateral roll positioning of the crystal;

FIG. 8 is a perspective view showing the carriage applied to a rail and including a diagrammatic representation of an ultrasonic system that controls both lateral pivotal movements, and lateral roll movements of the crystal in accordance with the signal strength of the base echo;

FIG. 9 is a schematic diagram showing the electrical components of a portion of the automatic control system of FIG. 8;

FIG. 10 is a schematic view indicating an alternative arrangement for simultaneously controlling a plurality of different crystal movements;

FIG. 11 is a plan view of a carriage adapted for application to the gauge edge of the rail with parts being broken away and shown in section;

FIG. 12 is a view partially in section taken in the vertical planes of the line 12—12 of FIG. 11;

FIG. 13 is a front sectional view taken in the vertical planes of the line 13—13 of FIG. 11;

FIG. 14 is a fragmentary rear sectional view taken in the vertical planes of line 14—14 of FIG. 11;

FIG. 15 is a fragmentary front sectional view taken in the vertical planes of line 15—15 of FIG. 11;

FIG. 16 is a side sectional view taken in the vertical plane of line 16—16 of FIG. 11;

FIG. 17 is a plan view of a modified form of carriage adapted for application to the gauge edge of the rail with parts broken away and sectioned;

FIG. 18 is a side elevational view of the carriage of FIG. 17 as view from the gauge edge of the rail as indicated by the line 18—18 of FIG. 17; and FIGS. 19 and 20 are front sectional views of the carriage of FIG. 17 and are taken in the vertical planes of lines 19—19 and 20—20, respectively, of FIG. 17.

*Suspension System*

In general, the crystal positioning and control equipment for ultrasonic rail testing applications consists of a suspension system carrying a pair of carriages designated generally as 31 that are adapted to rest upon and engage the rail surfaces for the purpose of following the same during the progressive testing of the track rails. The suspension system controls the movements of the carriages between their operative positions wherein they contact the rail and their inoperative positions wherein they are held raised above the rails and located inwardly thereof.

Figure 1:
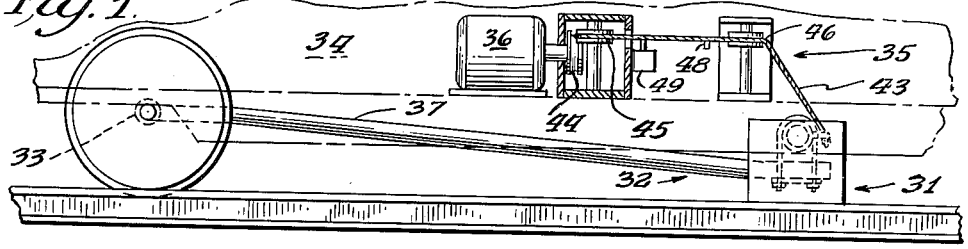
FIG. 1 is a fragmentary side view of a detector car having a crystal suspension and carriage arrangement in accordance with the invention.
Figure 2:
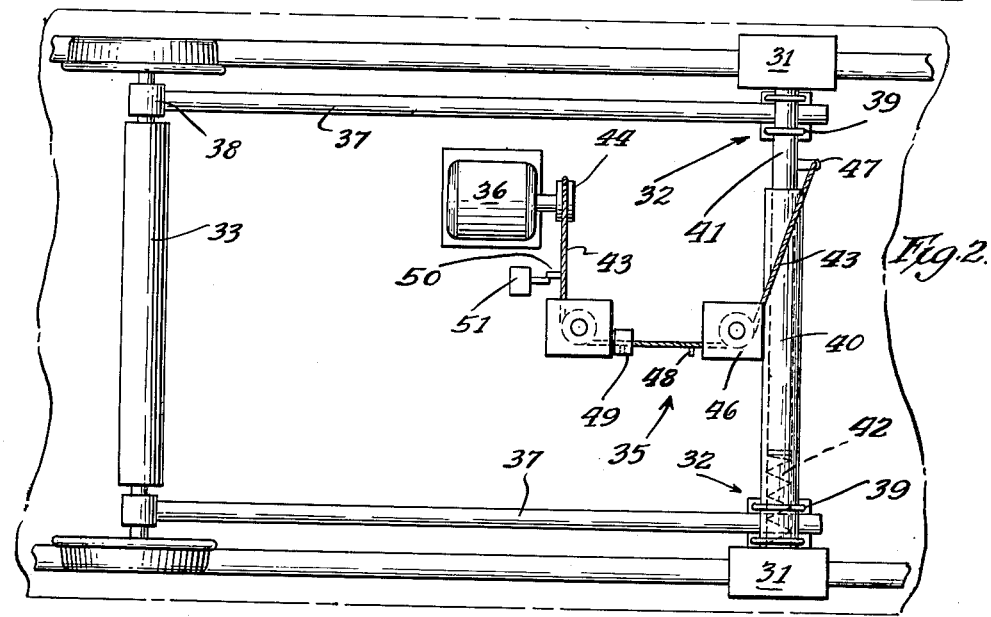
FIG. 2 is a fragmentary plan view taken beneath the frame of the car and illustrating the suspension system in more detail.

The suspension system is shown somewhat schematically in FIGS. 1 and 2 and includes a frame designated generally as 32 connected to a front axle 33 of a detector car 34, a pulley and cable system generally designated 35, and a driving motor 36. Thus the suspension system is located underneath the car frame and is pulled along by the front axle 33.

The frame 32 consists of a pair of generally parallel arms 37 having their front ends connected by suitable rubber joints 38 to the remote ends of axle 33 and having their rear ends connected by suitable clamping devices 39 to an extensible telescoping bar assembly. The rubber joints permit the frame 32 to be moved between its operative and inoperative positions and also permit the arms 37 to swing laterally under the influence of the telescoping bar arrangement.

The outer and inner telescoping bars are designated 40 and 41, respectively, and they are continually urged apart by a bias spring 42. The carriages 31 are rigidly carried at the remote ends of the telescoping bars and each carriage includes a gauge shoe which slides along the rail and is maintained at a constant angle in all directions in order to provide a fixed reference support for the crystal transducer relative to the base of the rail. The longitudinal angle of incline of the gauge shoes is maintained by the parallel arms 37 and can be adjusted as desired by varying the location of the connection between the parallel bars 37 and the telescoping bars. The vertical lateral angle of incline of the gauge shoes is maintained by the telescoping bars which extend between the rails and thus is determined in accordance with the relative height and angle of the two rails.

The cable system 35 includes a cable 43 carried on a winch pulley 44 associated with the driving motor 36 and passing through intermediate pulleys 45 and 46 anchored respectively to the car frame and the outer telescoping bar 40. The free end of cable 43 is secured to a lug 47 provided on the inner telescoping bar 41. Contraction and extension of the telescoping bar arrangement is coordinated with the upward and downward movements of the frame by correlating the spring constant of the bias spring 42 with the cable tension required to overcome the weight of the frame.

The suspension system functions as follows: A suitable switch (not shown) applies power to the motor 36 to drive the pulley 44 in a direction to take in the cable 43. The initial tension contacts the telescoping rods and moves the carriages 31 away from the rails. This movement is limited by abutment of the lug 47 carried by the inner telecoping bar with the adjacent end of the outer telescoping bar 40. From this point on the frame is raised to its out of the way position and a cable lug 48 cooperates with a limit switch 49 to turn off the motor when this position is reached.

In lowering the carriages the pulley 44 pays out the cable 43 and the initial movement consists of pivotal movement of the frame about the axle 33. At some intermediate point the bias spring 42 also causes the telescoping bars to expand and both degrees of movement continue until the gauge shoes abut against the rail and limit further expansion of the telescoping bars. At this point a cable lug 50 cooperates with a limit switch 51 to turn off the motor.

*Methods of Applying Ultrasound to the Rail*

Figure 3:
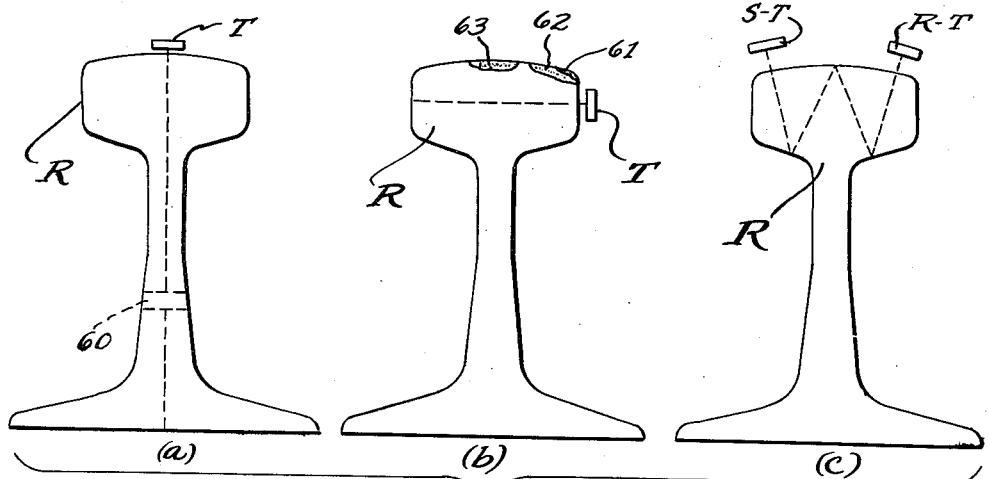

Due to the peculiar shape of the rail as mentioned previously, it is not possible to inspect all of the internal portions of the rail by a single incident beam; however, by a judicious selection, the present invention provides for testing substantially the entire rail using only two incident beams and reference should be had to FIG. 3 for illustrating these arrangements.

In FIG. 3(a) a transducer T is shown positioned directly over the center of the running surface of a rail R to send an ultrasonic beam through the head and the web for reflection from the base surface and return to the transducer T. The transducer T may serve as both the sender and receiver of the ultrasound, in which case it would be substantially parallel with the parallel running and base surfaces of the rail. In the arrangement of FIG. 3(a) the device is particularly adapted to the detection of breaks in the bolt hole region as indicated at 60 and head-web separations. The arrangement, of course, will detect other internal flaws, particularly horizontal split heads.

Obviously the arrangement of FIG. 3(a) cannot detect detail fractures such as occur on the side edges of the rail and to accomplish this the transducer is shown in FIG. 3(b) as applied to the gauge edge of the rail. When thus applied a beam is sent through the rail head in a transverse direction and here again a single sending and receiving transducer arranged parallel to the parallel side edges of the rail may be employed. In particular it is noted that head checks such as indicated at 61, shelley as indicated at 62, and burns as indicated at 63 are avoided by locating the transducer sufficiently below the top surface of the rail.

An alternative arrangement for inspecting the head of the rail is shown in FIG. 3(c) wherein separate sending and receiving transducers S-T and R-T are positioned on opposite sides of the center of the head to project a generally W-shaped beam of ultrasound into the head of the rail.

It should be apparent that various combinations of the methods shown in FIGS. 3(a), 3(b), and 3(c), may be employed in order to accomplish a complete inspection of the entire internal region of the rail.

It is proposed to test rail by a method that examines the strength of the base echo in determining the internal structure of the rail. A constant strength base echo indicates a flawless rail whereas the absence or weakening of the base echo indicates an internal flaw. Actually the base echo is affected by other conditions such as loss of adequate coupling, failure in the electronic system, and certain types of surface defects. Inspection will readily reveal such conditions.

It has long been considered that defects oriented entirely in the plane of travel of the ultrasonic beams produce such a limited reflection of the impinging ultrasound as to preclude detection of such defects. This is true in the case of a system operating on an echo from a defect principle, however, the present invention takes advantage of the fact that a large majority of the internal defects in rail are formed with sufficiently ragged side edges that even if located in the plane of propagation of the ultrasound, they absorb and deflect a significant percentage of the impinging ultrasound and thus diminish the base echo an appreciable amount.

There are flaws in rail that are inclined at an angle to the impinging beam of ultrasound so that they deflect the beam at an angle and can be detected by the base echo method but since the deflected beam does not return as desired, these flaws may easily be overlooked by the echo from a defect method.

In the case of FIG. 3(a) where the transducer is parallel to the parallel running and back surfaces of the rail, it is interesting that the base-echo method of operation has been found to detect a high percentage of vertical split heads and transverse fissures though they are oriented in the plane of propagation of the ultrasound.

In either or both of the arrangements of FIGS. 3(a) and (b), the single sending transducer may be replaced by a separate sending transducer and a separate receiving transducer and these would be spaced apart longitudinally along the rail and inclined relative to the rail at equal and opposite angles. Thus the crystals are arranged so that the beam passes through an entering surface of the rail for reflection from the opposed surface of the rail and returns through the entering surface to the receiving transducer.

When two separate transducers are thus arranged very definite indications are produced by all defects because the beam travels through the rail at a different angle during its entering travel than during its return travel. If a defect lies in the plane of the entering beam it necessarily blocks or deflects the returning beam. Obviously it is of little moment whether a defect does or does not have ragged edge surfaces.

Specific carriage constructions for carrying out these rail testing methods are shown hereinafter.

*Carriage for Transmitting Ultrasound Through Running Surface of Rail*

The carriage is shown in FIGS. 4, 5 and 6 and includes a gauge shoe generally designated 100 and having a horizontal portion 101 adapted to ride over the running surface of the rail and a vertical portion 102 the lower part of which is adapted for abutting engagement with the gauge edge of the rail and the upper part of which is rigidly secured to one of the telescoping bars 40. The horizontal portion 101 has upturned ends as indicated at 103 to permit it to ride over uneven adjacent rail ends and other irregularities in its path. The lower part 104 of vertical portion 102 is urged against the gauge edge of the rail by the bias spring 42 that continually urges the telescoping bars apart. The weight of the frame 32 is imposed upon the rail R by the gauge shoes and as explained previously the frame determines and maintains the angle of orientation of the shoes 100 relative to the base of the rail.

The gauge shoes 100 thus provide a fixed reference support for a movable crystal that is mounted in a crystal holder generally designated 106. The crystal holder 106 is movably supported on the gauge shoe 100 and for this purpose is connected to a bar 107 that extends rearwardly from the gauge shoe and that is provided at its front end with a pair of vertically depending bars 108 the lower ends of which are pivotally mounted on the remote ends of the horizontal bar of a spider 109 by means of suitable ball bearing facilities 110. The spider 109 is of the same general form as the spider commonly employed in a universal joint and in the present case has its vertical bar rotatably mounted in suitable ball bearing facilities 111 carried by a pair of vertically spaced laterally projecting arms 112.

Immediately above the vertical bar of the spider 109, the bar 107 that supports the crystal is connected to a reciprocable rod 114 that may be connected to any suitable driving means (not shown). A similar reciprocable rod 115 is also connected to the bar 107 at a point located rearwardly of the rod 114 and the rod 115 is connected to a suitable independent driving means (not shown).

It should be apparent that as the rod 114 is reciprocated in a horizontal plane in a direction laterally of the rail the spider 109 will remain motionless but the depending arms 108 will pivot about the horizontal bar of the spider and consequently the crystal holder 106 will pivot in a lateral plane about this horizontal bar. This movement of the crystal holder and connecting bar 107 is indicated in phantom lines in FIG. 6 and it regulates the vertical lateral angle of the crystal and is hereinafter designated "lateral roll."

Similarly when the rod 115 is reciprocated in a horizontal plane in a direction laterally of the rail the arms 108 remain fixed relative to the horizontal bar of the spider but the vertical bar of the spider pivots in its bearings 111 and the connecting bar 107 and holder 106 swing ltaerally in a horizontal plane. This movement is indicated in phantom lines in FIG. 5 and is hereinafter designated "lateral pivotal movement."

In the present arrangement the transducer crystal T is arranged substantially parallel to the running surface of the rail and this involves an adjustment of the longitudinal roll. For this purpose a resilient spacer 116 of rubber or other similar material is interposed between the connecting bar 107 and the crystal holder 106 and the parts are connected together by a plurality of screws 117. The screws 117 are arranged longitudinally of the rail and by suitable adjustment permit tipping of the crystal longitudinally.

It will be understood that in the present arrangement a single crystal serves both as the sender and the receiver and while it is preferred that it be oriented substantially parallel with the running surface of the rail this specific disclosure should not be construed as limiting the scope of the invention. Furthermore, separate sending and receiving crystals may be employed and in such a case they would be spaced apart longitudinally and symmetrically arranged at opposite longitudinal angles relative to the running surface of the rail.

The crystal holder 106 consists of a Bakelite base 118 having a stepped recess for mounting the crystal with an air backing-pocket 119 and a hollow depending tube 120 of hard rubber or plastic material. The tube 120 is in open communication with an elongated boot 121 of a flexible and resilient material such as rubber and the boot is guided in its travel along the rail by means of a rearwardly extending arm 122 that is fixedly secured to the upper vertical portion 102 of the gauge shoe 100. A coupling liquid supply line is shown at 123 and it connects with a passage 124 formed in the Bakelite block 118 to supply coupling liquid for filling the rubber boot 121 and tube 120. A source of water, not shown, is mounted on the detector car at a desired height above the rail and maintains a slight additional pressure on the water column. This pressure causes the boot to follow the contours of the running surface of the rail more reliably and more quickly.

The rubber boot arrangement for confining the water column that couples ultrasound between the rail and the crystal offers a considerable savings in the amount of coupling liquid required since it is necessary to maintain a water column of substantial height not only to protect the crystal from mechanical damage but also to allow for the desired crystal movements. In this connection it will be noted that the rubber boot yields sufficiently to accommodate any desired crystal movements without causing corresponding movement of the boot.

To complete the ultrasonic coupling it is necessary to provide small amounts of coupling liquid between the contacting surfaces of the rubber boot and the rail and the use of an elongated boot offers the advantage of additionally conserving on the amount of coupling liquid required for this purpose. This arises from the fact that the elongated boot spreads the coupling liquid evenly and thinly over the head of the rail.

The carriage of FIGS. 4, 5 and 6, in cooperation with the suspension system follows the rail and provides a convenient support for the crystal which is substantially unchanging relative to the rail base and which accommodates various degrees of crystal movement without in any way affecting the ultrasonic coupling between the crystal and the rail.

It is contemplated that the reciprocable rods 114 and 115 may be controlled from a remote point such as by an operator riding in the car. As the contour of the rail head changes, such as when going around curves in the track, the incident beam is deflected from its original path and it is necessary to compensate for such change by varying the lateral roll and by varying the lateral pivotal position of the crystal in order to maintain the crystal in proper working relationship with the rail. The lateral roll angle of the crystal should be changed about one degree for every four degrees variation in rail head contour and the lateral pivotal movement of the crystal should maintain the crystal substantially over the center of the rail head.

*Automatic Crystal Positioning Relative to Running Surface*

Various means for automatically controlling the crystal positioning of the carriage of FIGS. 4, 5 and 6 are shown in FIGS. 7–10. A basic method for automatically positioning the crystal in order to maintain a proper relationship during changes in the rail contour is the use of a mechanical feeler which mechanically measures the extent of such changes and supplies the information to a compensating device. A carriage for this purpose is shown in perspective applied to a rail R in FIG. 7 and is substantially the same as the carriage of FIGS. 4, 5 and 6. Similar reference numerals designate the corresponding parts.

The only carriage modifications consist in extending the vertical portion 102 of the gauge shoe 100 as indicated at 200 and in piercing the upturned end 103 of the horizontal portion of the gauge shoe for fixedly mounting a longitudially extending rod 201. A feeler shoe 202 adapted to ride along and follow the changing contour of the running surface of the rail is telescoped over the rod 201 for rotation thereon while following the rail.

The forward extension 200 of the vertical portion of the gauge shoe supports a platform 203 which in turn mounts a control potentiometer 204 that is connected to the feeler shoe 202 through successive coplanar links 205, 206 and 207. Therefore, the movements of the shoe 202 are transmitted to and vary the resistance of the control potentiometer 204. The shoe is maintained in contact with the rail surface at all times by a compression spring 208 which reacts between the platform 203 and a forward portion of the shoe 202.

The control potentiometer 204 supplies intelligence concerning the rail surface contour to a control unit 209 which is arranged to determine the required degree of crystal movement for compensating for this change in the rail contour. The control unit supplies driving power to a servo-motor 210 to drive the crystal in a direction to compensate for the contour changes. For this purpose the motor 210 is connected to the bar 107 at a point directly above the vertical bar of the spider 109 by means of successive links 211, 212, and 213. The range of motor movement is controlled in accordance with a compensating potentiometer 214 connected by a link 215 to an extension of the link 212 for following the motor movements. Thus the motor movements cause variations in the resistance of the compensating potentiometer 214 and this intelligence is also fed into the control unit 209 for terminating motor movements at the appropriate time.

The servo equipment consisting of the control potentiometer 204, the control unit 209, the motor 210 and the compensating potentiometer 214 are well known standard commercial items and a detailed description is not deemed necessary. It is appropriate, however, to point out that the crystal movements while proportional to the movements of the feeler shoe 202 are not of equal magnitude. Of course the required lateral roll of the crystal is in part dependent upon the height of the crystal above the rail but the controlling concept is that the crystal should be positioned at an angle of incidence such that the impinging ultrasound will be refracted along a path such that it will pass through the center of the web of the rail. For the arrangement shown and within the limited range of movements contemplated it has been found that one degree of lateral roll of the crystal compensates for a four degree change in angle of the running surface of the rail. This relationship arises from the fact that ultrasound travels four times as fast in the steel rail as in the water column.

The foregoing arrangement illustrated automatic mechanical means for controlling the lateral roll. It should be apparent that mechanical means might also be provided for actuating reciprocable rod 115 to control the lateral pivotal movement and in this case a mechanical means for measuring track curvature would be employed to provide the necessary control intelligence. The extension of the automatic control principle to such an application is believed self evident, and for briefness, no specific illustration is included.

A more refined system for maintaining the crystal in proper working relationship with the rail is shown in FIG. 8 and this system is entirely automatic and operates on the principle of maintaining constant signal strength of the base reflection. According to the specific application disclosed, the crystal is maintained centrally over the rail and substantially parallel to the running surface and base surface of the rail so that the impinging beams travel down through the web and upon reflection from the base return to the crystal.

According to the invention it is desired to maintain the crystal properly centered as respects lateral roll and lateral pivotal movements and this is done by continuously driving the reciprocable arms 114 and 115 to cause the crystal to oscillate about its respective central positions. The movements of the arms 114 and 115 are timed such that they are 90 degrees out of phase. Thus when the arm 114 is at one of its limit positions the arm 115 is properly centered and vice versa. By reason of this out of phase relationship it is possible to segregate these two different degrees of movement for individual inspection even though the crystal actually generates a complex motion pattern. An exemplary control system of this type is also shown in FIG. 8.

The system utilizes a crank 220 connected to and driven by a drive shaft 221 that is continuously driven at a speed of approximately 400 r.p.m. by a suitable motor (not shown) and the crank 220 drives a pair of piston rods 222 and 223. Connecting rod 222 powers a piston and cylinder arrangement 224 which is hydraulically connected to a second piston and cylinder arrangement 225 for reciprocating rod 114. Similarly, piston rod 223 is connected to a piston and cylinder arrangement 226 which is in turn hydraulically connected to a second piston and cylinder arrangement 227 that reciprocates rod 115.

It will be noted that piston arrangements 224 and 226 are connected relative to the crank 220 and drive shaft 221 such that the motion which each generates is out of phase by 90 degrees. Thus the system drives rods 114 and 115 in such a manner that the crystal continuously oscillates in two different directions about its center point.

These crystal movements are related such that when rod 114 is centered and hence the crystal is centered with respect to lateral roll rod 115 causes the crystal to be at one of its limit positions of lateral pivotal movement. This is the position in which the system is shown in FIG. 8 and in this position it may be seen that the base reflection signal strength will be of a reduced magnitude. This reduction in magnitude is due to the fact that the crystal is off its center position as respects lateral pivotal movement. According to the invention, the signal strength at this location is measured and memorized for comparison with the signal strength when the parts assume a position 180 degrees out of phase. In this 180 degree out of phase position the reduced signal strength will again be due to the fact that the crystal is off center as respects lateral pivotal movement and is in no way caused by lateral roll since the crystal is again centered as respects this degree of movement.

If the comparison of the two 180 degree out of phase lateral pivotal positions indicates that the reductions in signal strength for these two positions are equal then, as respects lateral pivotal movement, the crystal is oscillating about a correct center point and therefore no compensating movements are necessary.

Assuming however that the comparison of the reductions in magnitude indicates an unbalance, an automatic control system causes motor 228 to drive a piston rod 229 for actuating a piston and cylinder arrangement 230 which is hydraulically connected to the piston and cylinder arrangement 227 and which varies the center point of operation of the same by an appropriate amount to center the crystal with respect to lateral pivotal movement.

To accomplish this independent control of the different degrees of movement, a rotary switch generally designated 231 and having a contact arm 232 connected for rotation with drive shaft 221 to successively contact segments 233, 234, 235 and 236 is synchronized with the crystal movements. Thus when rod 115 is at one of its limit positions the contact arm 232 of the rotary switch engages segment 233 for delivering reflected signals to memory unit 237 and when rod 115 is in its opposite limit position contact arm 232 engages segment 235 to supply reflected signals to memory unit 238. Similarly when rod 114 is in one of its limit positions contact arm 232 engages segment 234 to supply reflected signals to memory unit 239 and when rod 114 is in its opposite limit position contact arm 232 engages segment 236 to supply reflected signals to memory unit 240.

Memory units 237 and 238 supply their control intelligence to a voltage comparison network 241 which balances to zero for equal reductions in signal strength and which feeds an actuating voltage to a control unit 242 when unbalances exist. In such cases, control unit 242 causes motor 228 to operate and adjust the positioning of the piston and cylinder arrangement 227 through the action of the intermediate piston and cylinder arrangement 230. The degree of adjustment is controlled by a compensating potentiometer 243 that is also actuated by the motor 228 and feeds a compensating voltage back into the control 242. The operation of the servo equipment is conventional and forms no part of the invention.

Similarly memory devices 239 and 240 supply their outputs to a voltage comparison network 244 which supplies control intelligence to a similar control unit 245. Control unit 245 actuates motor 246 to drive a piston and cylinder arrangement 247 that is hydraulically connected to piston and cylinder arrangement 225 and that is effective to adjust the center point of operation of the same. Movement of motor 246 also actuates control potentiometer 248 which supplies compensating voltage to the control unit 245 and terminates operation of the motor 246.

The control system of the invention may be used with any ultrasonic system and while it is preferred that it be used with the system described in my concurrently filed application entitled "Method and Apparatus for Ultrasonic Materials Testing," Serial No. 544,634 filed November 3, 1955, now Patent No. 2,949,028, the disclosure of which, insofar as it is not inconsistent is specifically incorporated by reference, it is by no means limited to use with such a system.

To facilitate the understanding of the use of my invention with an ultrasonic testing system, FIG. 8 includes a block diagram of a representative system. The ultrasonic system as shown includes a rate generator 250 which may operate at a rate of 2000 times per second to initiate a transmitter 251 and which also initiates a gating circuit 252 for operation in timed relation to the transmitter 251. The remainder of the system consists of a receiver 253, that detects the reflected sgnals and an indicator 254 that produces an indication for those signals which the gating circuit 252 passes to the indicator.

It should be noted that in the system as shown the base reflections which are supplied to the contact arm 232 of the rotary switch are also permitted to actuate the indicator and thus this system is of the fail safe type in that anything which interrupts the base echo will cause the indicator to respond. When operated in this manner, the gating interval is selected so that all of the energy, reflected from the base and returning to the receiver, is effective to actuate the receiver or indicator. By using a plurality of gating circuits, however, the base echo can be separated for application only to the rotary switch 231 and echos from flaws can be separated for application only to the indicator 254.

The operation of the memory units may best be understood by reference to the schematic diagram of FIG. 9 wherein a portion of the rotary switch is shown associated with memory units 237 and 238. Memory unit 237 employs a cathode follower tube 256 which applies its output to a five megohm resistor 257 that forms a portion of the voltage comparison network 241. Memory unit 238 consists of a cathode follower tube 259 that responds proportionally to the incoming signals and applies its output to a tube 260 which is held in a normally non-conductive state and which supplies its output to a 5 megohm resistor 261 that forms the other portion of the voltage comparison network. The center point of the network 241 is connected by a wire 262 to control unit 242.

The signals delivered to the contact arm 232 from the ultrasonic system of FIG. 8 are short pulses of positive potential and of approximately 50 volts magnitude. Considering the position of the parts as indicated in FIG. 9 a plus 50 volt signal is applied to the grid of cathode follower 256 and drives the cathode of that tube to approximately 50 volts. A network consisting of a resistor 264 and capacitor 265 is arranged to have an RC time constant such that this 50 volt potential will be maintained for approximately one second. Meanwhile the arm 232 swings around and engages the opposite segment 235 and applies a plus 50 volt signal thereto. This positive signal when applied to the grid of tube 259 drives the cathode of that tube in a positive direction to apply a positive voltage to the grid of tube 260. Tube 260 is normally nonconductive but the application of the positive voltage to the grid causes it to conduct and drives its plate from approximately zero potential to approximately minus 50 volts and this value is also maintained for approximately one second because the resistor 266 and capacitor 267 provide a rather large time constant.

According to the specific arrangement disclosed the contact arm 232 rotates at a speed of 400 r.p.m. and base reflections occur at the rate of 2000 times per second. The segments of the rotary switch actually span approximately 10 degrees and thus they receive approximately 9 reflected pulses for each revolution of the rotary switch. When the crystal is centered with respect to lateral pivotal movement, the voltages applied to resistors 257 and 261 are approximately equal and opposite such that they cancel out and do not cause operation of the control unit 242. If however, the crystal becomes off center one of the voltages will predominate over the other to produce a resultant unbalance, the sign of which determines the direction in which the servo-motor must rotate in order to make the correction and the magnitude of which determines the amount of rotation required to properly center the crystal.

The control system of FIG. 8 is believed to have broad application particularly as respects the concept of segregating for individual inspection a plurality of degrees of movement. It should also be apparent that separate sending and receiving crystals can also be controlled though of course they must be moved in unison and must be arranged symmetrically with respect to the region under test.

The control system is shown as consisting of hydraulically connected piston and cylinder arrangements but by no means is limited thereto. For instance, the pistons could be replaced by diaphragms and this is readily possible in ultrasonic rail testing applications since the actual crystal movement is extremely small. In fact, direct mechanical linkages between the crankshaft and the rods 114 and 115 might be employed though the hydraulic system is preferred since it permits the bulky equipment to be mounted in the car proper with only individual hydraulic lines extending down to the carriage.

Experience may dictate the desirability of providing additional degrees of movement of the crystal and since such an application would make the use of a crankshaft unwieldy a modified arrangement is suggested in FIG. 10 wherein a drive shaft 270 is provided with an appropriately shaped projecting cam 271 that successively actuates piston rods 272 which carry suitable follower wheels 273. It may be seen that a plurality of piston and cylinder arrangements 274 may thus be separately actuated.

*Carriage for Transmitting Ultrasound Through Gauge Surface of Rail*

A carriage adapted to support a crystal for transmitting ultrasound into a rail through its gauge surface may constitute the carriage designated 31 in FIGS. 1 and 2. One such carriage is shown in FIGS. 11–16 and as shown is provided with a mechanical feeler arrangement for sensing changes in contour of the gauge surface of the rail. This mechanical feeler is connected to an automatic control unit which adjusts the crystal positioning.

This side edge carriage includes a gauge shoe generally designated 300 which again serves as the main support for the transducer crystal and associated control equipment and which includes a horizontal portion 301 adapted for sliding engagement with the running surface of the rail R, an upper vertical portion 302 (best shown in FIGS. 12 and 15) rigidly attached to one of the telescoping rods 40, and a lower vertical portion 303 adapted for sliding engagement with the gauge surface of the rail R. Portion 303 is formed with an elongated rectangular opening 304 that receives an elongated feeler shoe 305 (see FIG. 16). The shoe 305 is formed with cylindrical studs 306 at its opposite ends and these studs are rotatably mounted in the portion 303. A pair of laterally extending arms 307 project from the portions 303 and are formed with mounting holes 308 that receive cylindrical studs 309 carried at the opposite ends of a frame 310. Thus the frame 310 is pivotally mounted on the gauge shoe 300.

The crystals T are fixedly mounted relative to the support frame 310 and for this purpose are attached to base blocks 311 which in turn are secured to the support frame by a plurality of screws 312. A backing member 313 of resilient material such as rubber is interposed between the holder 311 and the frame 310 and by suitable adjustment of the screws 312 permits the crystal orientation to be fixedly adjusted as desired.

As shown in FIGS. 11 and 16 the feeler shoe 305 is formed with a pair of longitudinally spaced openings 315 and rubber tubes 316 are connected between the holders 311 and the associated feeler shoe openings 315 to define coupling liquid compartments 317. The compartments 317 are substantially water-tight except for a slight amount of leakage which occurs between the feeler shoe and the gauge surface of the rail. A bias spring 318 acts between the frame 310 and feeler shoe 305 to maintain the feeler shoe in flush engagement with the gauge surface of the rail and this not only forces the feeler shoe to follow changes in contour of the gauge surface but it also contributes to maintaining the compartments 317 relatively water-tight.

A control potentiometer 320, a motor 321 and a compensating potentiometer 322 are mounted on horizontal portion 301 of the gauge shoe and are adapted to be connected with a servo-mechanism of the same character as that indicated and described at 209 in FIG. 7. Control potentiometer 320 is connected by a crank 318 and a link 323 to an upstanding arm 324 formed integral with the feeler shoe 305. Thus as the feeler shoe rotates in its bearings in the portion 303 in following changing contours of the rail the linkage arrangement actuates control potentiometer 320 which in turn unbalances the master unit and causes motor 321 to become energized. As shown in FIG. 14 rotation of motor 321 which is connected to the frame 310 through a crank 319 and a pair of links 326 and 327 causes the frame 310 to pivot relative to the gauge shoe and thereby effects a variation in the orientation of the crystals. Potentiometer 322 is connected to the motor 321 and rotates therewith to provide a master unit with a compensating voltage that causes motor 321 to become deenergized when the appropriate adjustment has been completed.

The arrangement shown in FIGS. 11–16 permits effective testing of the entire cross section of the head of the rail R. The arrangement is preferably operated so that one of the crystals is a sending crystal and the other is a receiving crystal. The crystals are arranged in longitudinally spaced relationship and are oriented such that ultrasound emitted by the sending crystal passes through the rail and is reflected from the far surface thereof whereupon it is propagated through the rail and presented to the receiving crystal.

The system is preferably operated on the principle of detecting decreases in strength of the echo from the field side of the rail and any internal discontinuity which interrupts or deflects or absorbs the ultrasound will appear as a reduction in magnitude of the reflection from the field surface of the rail.

In FIG. 11 the transmitted beam of ultrasound is designated 330 and is shown as being formed into a pencil-like beam by masking the sending crystal with a plate 331 of sound-absorbent material which is formed with an opening 332 of the size and shape which the beam is to have. It is not necessary to the invention that the beam be of any particular size and shape though it is preferred that it be small and round. The reflected beam of ultrasound is designated 333 and it will be noted that it passes through the material under test at an angle that is different from the angle of the transmitted beam.

Therefore, irrespective of the orientation of any given flaw, it must intercept one of these beams and produce an indication of a flaw. A further advantage of the system is that even if a flaw lies in the plane of the beam of ultrasound it normally presents rough edges along that plane which, while not capable of reflecting the beam to permit direct echo from a flaw detection, do effectively absorb the ultrasound and consequently produce a substantial weakening in the reflection from the field side of the rail.

FIG. 13 illustrates the approximate elevation at which the ultrasonic beam 330 passes through the head of the rail R. It may be seen that the beam passes approximately through the center of the area designated 335 and this area is the critical area. It has been found that all rail head defects of any consequence have at least a portion that intercepts this critical area. It should also be apparent to those skilled in the art that the ultrasonic beam enters the gauge edge of the rail at a point located well beneath the point where inconsequential surface defects might tend to interrupt the beam.

For example, the line 336 in FIG. 13 indicates the usual depth of penetration of head check defects; the line 337 indicates the usual depth of shellied rail and line 338 indicates a typical burn type of defect. It is desired that such inconsequential defects be ignored and in testing with ultrasonics this is done by locating the beam such that it does not encounter such defects.

There are also many instances when the upper lip on the gauge side of the rail is rolled over as indicated at 339 in FIG. 13 and the construction and arrangement of the carriage provides the necessary clearance so that rolled over portions do not in any way interfere or block the travel of the carriage and/or the position of the feeler shoe 305.

Carriages of the type shown in FIGS. 11–16 which provide for transmitting ultrasound through the gauge side of the rail are particularly effective in testing high curve rail for defects. Experience has shown high curve rail to be one of the major factors in accidents resulting from broken rails. While this fact has been common knowledge for many years, little has been forthcoming in the form of a solution since such an inspection application is complicated by the presence of head check and shelly rail.

For illustrative purposes, separate sending and receiving crystals have been shown and they are arranged at equal and opposite angles relative to the rail and operate on the assumption that the rail contour adjacent each of the crystals will be similar. Thus the feeler shoe 305 spans both crystals and measures a composite contour and adjusts both crystals simultaneously and in identical fashion. Obviously there are circumstances wherein the system will become temporarily ineffective such as when the rail contours for the transmitted and reflected beams are different. While this limitation is recognized the advantages accruing from the use of two crystals are believed to more than compensate.

If desired, a single sending and receiving crystal might be located as shown in FIG. 3(b) for transmitting ultrasound through the gauge surface of the rail and this application in essence would be similar to the arrangement of FIG. 7 wherein a single sending and receiving crystal was employed for directing ultrasound through the running surface of the rail.

In FIGS. 17-20 a modified form of carriage for transmitting ultrasound through the gauge surface of the rail is shown and while this modified form of carriage could be employed with mechanical means for automatically maintaining the crystal in proper working relationship it is illustrated and described in connection with an automatic control system operating on the principle of maintaining the strength of the reflection from the field side of the rail. Thus it should be understood that a control system of the general type illustrated in FIG. 8 is employed for controlling the positioning of the piston and cylinder arrangement that is generally designated 400. It will be understood, of course, that only one degree of movement is involved in the crystal arrangements that are applied to the gauge surface of the rail and this movement is best described as vertical roll.

The carriage of the embodiments of FIGS. 17-20 is designated generally at 401 and consists of a horizontal portion 402 and upper and lower vertical portions designated 403 and 404, respectively. The entire carriage is again mounted on the end of one of the telescoping rods and such a rod 40 is shown fixedly secured to the upper portion 403 of the gauge shoe. A pair of longitudinally spaced laterally extending arms 405 are apertured to form opposed mounting sockets which rotatably receive a pair of mounting pins 406 projecting from the opposite ends of a frame 407.

Thus the frame 407 is mounted for pivotal movement relative to the gauge shoe 401. Both the lower portion 404 of the gauge shoe and the frame 407 are formed with longitudinally spaced generally rectangularly shaped cut out portions designated 408 and 409, respectively. Ultrasonic coupling devices 410 in the form of rubber tires are suitably mounted on upper and lower collars designated 411 and 412, respectively, and telescoped over a fixed inner shaft 413 for rotation relative thereto. The shaft 413 is mounted in the frame 407 and spans the opening 409.

The coupling devices 410 define enclosed compartments which are completely filled with a suitable couplant and the arrangement offers a considerable saving in coupling liquid requirements while simultaneously providing a long lived holder. The rolling action of the coupling devices imposes little wear on the rubber tires. It will be noted that the crystals T are mounted in suitable holders 414 that are fixed to the inner shaft 413.

A piston and cylinder arrangement 400 reciprocates a rod 416 to cause the frame 407 to generate a continuous back and forth vertical roll movement. Both crystals move in unison and when the reductions in signal strength at each of the limit positions of the vertical roll movement exactly balance out, the sending and receiving crystals may be said to be in proper working relationship with the field edge of the rail. Any unbalances dictate an adjustment in the center point of operation of piston and cylinder arrangement 400 and this is effected in the manner described in connection with FIG. 8. A hydraulic tube 417 is shown connected to piston and cylinder arrangement 400 for reciprocating the same and also for adjusting the center point of its operation. This modified arrangement of FIGS. 17-20 operates on the same principle as the side carriage of FIGS. 11-16 but illustrates a preferred arrangement for coupling the crystals to the rail and in addition illustrates the application of reflected signal strength measurements in automatically controlling the orientation of the crystals.

Summary

In order to inspect the entire internal region of a rail, it is necessary to combine the testing procedure shown generally in FIG. 3(a) and embodied in the running surface carriage of FIGS. 4 to 8 with either the testing procedure shown generally in FIG. 3(b) and embodied in the gauge surface carriage of FIGS. 11 to 20 or the testing procedure of FIG. 3(c) for which no specific constructional device is disclosed. The manner of combining these various testing procedures is flexible. If desired a composite carriage may be provided or alternatively separate carriages may be provided on a single detector car. It is even possible to mount the different carriages on different detector cars; however, this procedure has many practical limitations.

Alternative arrangements for controlling the crystal positioning are disclosed hereinbefore. The carriage of FIGS. 4, 5, and 6 accommodates various independent degrees of crystal movement and these may be carried out manually, or mechanically as by the automatic mechanical feeler arrangement of FIG. 7, or may be carried out by an automatic ultrasonic arrangement operating in response to changes in the signal strength of the base echo as shown in FIG. 8. Two different forms of side surface carriage are shown and in each case they illustrate the use of separate sending and receiving transducers. While the use of separate sending and receiving transducers is more readily adaptable to a gauge surface carriage application, it should be understood that they may also be employed on a running surface carriage.

Finally, the disclosure brings out the merits in rail testing of the base echo principle of flaw detection. Not only is this method peculiarly adaptable to the specific types of flaws encountered in rail and enables the detection of any and all such flaws, but it also furnishes an immediate indication when any part of the ultrasonic system fails.

It is pertinent to point out that the presence of a flaw reduces or attenuates the signal strength of the received base echo. It is preferred to adjust the apparatus so that indications are recorded only for attenuation ratios of the order of 10:1 and in some experiments ratios of 30:1 have still permitted effective testing for the flaws in track rail.

When a carriage rides over a rail, a limited amount of vibration is present and this causes slight increases and decreases in the water column height and thus affects the travel time of the ultrasound in traveling to and returning from the base of the rail. The present invention allows for such variations by employing a gating interval of sufficient duration as to accommodate such changes in path length and, as stated, the gating interval should allow all of the energy returning from the base to act upon the indicating apparatus. Should certain of the changes in the path length of the base echos exceed the range of the gating interval, the relatively high attenuation ratios employed, nevertheless prevent false indications.

It is contemplated that in the progressive testing of rail the indicating device should preferably be a pen unit associated with a chronograph tape and/or a warning buzzer, light, or bell. These devices offer important advantages over a cathode ray oscillograph in the testing of rail.

It should be understood that the description of the preferred form of the invention is for the purpose of complying with Section 112, Title 35 of the U.S. Code and that the appended claims should be construed as broadly as the prior art will permit.

I claim:

1. In testing track rail, a system for suspending a pair of ultrasonic testing devices from a railway car for movement between an operative position wherein said devices are disposed in working relationship with each track rail and an inoperative position wherein said devices are elevated above and located inwardly of said rails; said system comprising a frame supported from said car for pivotal movement relative thereto about a transverse axis extending parallel to the plane of the rails, said frame including extensible supporting means comprising relatively slideable members resiliently urged apart in a direction extending parallel to said transverse axis and carrying said testing devices at its opposite ends, and raising and lowering means for said frame mounted on said car and including tension means engaging said members for sliding the same towards each other, the weight of said frame being correlated with the resilient force urging said members apart such that the tension applied by said raising and lowering means simultaneously slides said members towards each other while raising the frame and simultaneously allows said members to move apart while lowering the frame.

2. For use with an ultrasonic detector car adapted to progress a transducer over successive portions of a track rail; a carriage including a guide and support means riding on said rail, a spider having intersecting horizontal and vertical bars, one of said bars being mounted on said guide and support means for rotation relative thereto about the axis of said one bar, a support for said transducer mounted on said other bar for rotation relative to said spider about the axis of said other bar and movable along said rail with said guide and support means to carry said transducer in working relationship with said rail, first movable means connected to said support for pivoting the transducer relative to said guide and support means about the axis of said one bar, and second movable means connected to said support for pivoting the transducer relative to said guide and support means about the axis of said other bar.

3. In a system for maintaining signal sending and receiving means in working relationship with a region of a medium wherein the sending and receiving means is capable of a plurality of different modes of movement relative to the medium each of which tends to interrupt said working relationship: a drive means; a plurality of actuating means connected to said drive means for periodically and individually moving said sending and receiving means to opposite limit positions of each of said different modes of movement; comparison means for each of said modes of movement responsive to the strength of the received signals at the opposite limits of movement to detect changes in said working relationship resulting from such mode of movement; segregating means connected to said drive means for periodically and individually connecting said sending and receiving means to said comparison means such that said different modes of movement are associated with their respective comparison means independently of the remaining modes of movement; and positioning means connected to each of said comparison means for adjusting the sending and receiving means relative to each of said modes of movement to maintain said working relationship.

4. The arrangement of claim 1 wherein each of said opposite ends is provided with a rail-contacting guide having a flange engageable with the flange edge of the rail when said frame is lowered and said members move apart.

5. In an ultrasonic rail testing system in which an ultrasonic detector car progresses an ultrasonic transducer over successive portions of a track rail, a carriage suspended from said car for movement therewith and including a guide engaging a portion of said rail to ride in predetermined position on the rail, a holder for the transducer, connection means supportingly mounting said holder from said guide to carry the transducer in spaced apart working relationship with a portion of the rail other than the portion engaged by said guide, said connection means including first means accommodating swinging movement of the holder about an axis parallel to the general longitudinal direction of the rail and second means accommodating swinging movement of the holder about a generally vertical axis, and separate means for independently actuating said connection means to swing said holder about either or both of said axes.

6. In an ultrasonic rail testing system in which an ultrasonic detector car progresses an ultrasonic transducer over successive portions of a track rail, a carriage suspended from said car for movement therewith and including a guide engaging a portion of said rail to ride in predetermined position on the rail, a holder for the transducer, connection means supportingly mounting said holder from said guide for movement therewith to carry the transducer in spaced apart working relationship with a portion of the rail other than the rail portion engaged by said guide, with the holder being swingable about an axis parallel to the general longitudinal direction of the rail, means for sensing changes in the laterally extending surface contour of the rail, and positioning means proportionally responsive to said sensing means and connected to actuate said connection means correspondingly to swing said holder about said axis for maintaining the working relationship between the transducer and the rail.

7. In an ultrasonic rail testing system in which an ultrasonic detector car progresses an ultrasonic transducer over successive portions of a track rail, a carriage suspended from said car for movement therewith and including a guide engaging a portion of said rail to ride in predetermined position on the rail, a holder for the transducer, connection means supportingly mounting said holder from said guide for movement therewith to carry the transducer in spaced apart working relationship with a portion of the rail other than the rail portion engaged by said guide, with the holder being swingable about an axis parallel to the general longitudinal direction of the rail, control means for positioning said holder relative to said guide, and mechanical follower means mounted from said guide and engageable with the rail for detecting surface contour changes and mechanically linked to said control means for correspondingly actuating the same to swing said holder about said axis and maintain the working relationship between the transducer and the rail.

8. Apparatus for maintaining a predetermined geometrical working relationship between transducer means for sending and receiving directional ultrasonic signals and a body under test, said body having an entering surface through which said signals pass and a remote reflection surface for said signals, said apparatus comprising means for applying successive ultrasonic test signals in predetermined timed relation to said transducer means to produce corresponding successive mechanical vibrational signals, means for coupling said mechanical vibrational signals from said transducer means to said entering surface for producing reflected signals from said remote reflection surface, means for supporting said transducer means at a reference position in predetermined geometrical working relationship to and spaced a selected distance from the body under test, said reference position being the position at which reflected signals are most completely detected for the selected distance of spacing, means for shifting said transducer means between limits of movement on opposite sides of said reference position for effecting similar changes in said working relationship, comparison means connected to said transducer means and responsive to the strength of the reflected signals from said remote reflection surface received thereby at the opposite limits of movement thereof to produce a signal representative of any deviation from said predetermined working relationship due to contour changes of said body, and positioning means responsive to the signal from said comparison means and connected to said shifting means for correspondingly adjusting the position of the transducer means relative to said body to compensate for contour changes of said body.

9. The arrangement of claim 8 wherein said body is a track rail and wherein said supporting means is an ultrasonic detector car having a carriage suspended therefrom for movement therewith and including a guide engaging a portion of the rail to ride in predetermined position thereon, a holder for the transducer means, and connection means supportingly mounting the holder from the guide for carrying the transducer means in spaced apart working relationship with a portion of the rail other than the rail portion engaged by said guide, with the holder being swingable about an axis parallel to the general longitudinal direction of the rail, and wherein said shifting means is connected to said connection means for swinging the holder about said axis to vary the angular relationship between the transducer means and the rail.

10. In an ultrasonic rail testing system in which an ultrasonic detector car rides along a pair of rails to progress an ultrasonic transducer over successive portions of one of said rails, a carriage suspended from said car for movement therewith and including a guide ridably engaging a portion of said one rail and flexurally rigid reference means ridable on the other of said rails and connected to said guide to establish a predetermined reference position of said guide relative to a plane cooperably defined by said rails, a holder for said transducer supportedly mounted from said guide to hold the transducer in spaced apart relationship with a portion of said one rail at a vertical lateral angle relative to said one rail determined by the plane cooperably defined by said rails and means for coupling ultrasonic energy between said transducer and said one rail.

11. In an ultrasonic rail testing system in which an ultrasonic detector car rides along a pair of rails to progress an ultrasonic transducer over successive portions of one of said rails, a carriage suspended from said car for movement therewith and including a guide ridably engaging a portion of said one rail and flexurally rigid reference means ridable on the other of said rails and connected to said guide to establish a predetermined reference position of said guide relative to a plane cooperably defined by said rails, a holder for said transducer supportedly mounted in offset relation from said guide to hold the transducer in spaced apart relationship with a portion of the running surface of said one rail other than that engaged by said guide and at a vertical lateral angle relative to said one rail determined by the plane cooperably defined by said rails, and means for coupling ultrasonic energy between said transducer and said one rail.

12. In an ultrasonic rail testing system in which an ultrasonic detector car rides along a pair of rails to progress an ultrasonic transducer over successive portions of one of said rails, a carriage suspended from said car for movement therewith and including a guide ridably engaging a portion of said one rail and flexurally rigid reference means ridable on the other of said rails and connected to said guide to establish a predetermined reference position of said guide relative to a plane cooperably defined by said rails, a holder for said transducer, means for supportingly mounting said holder from said guide to locate the transducer at a reference position in predetermined geometrical working relationship to and spaced apart from a portion of the running surface of said one rail and including means for producing shifting movement of the holder with respect to said guide to provide for movement of the transducer in corresponding opposite directions from said reference position, means for selectively actuating said motion producing means for shifting said holder and transducer jointly in either of said directions and means for coupling ultrasonic energy between said transducer and said one rail.

13. In an ultrasonic rail testing system in which an ultrasonic detector car rides along a pair of rails to progress an ultrasonic transducer over successive portions of one of said rails, a carriage suspended from said car for movement therewith and including a guide engaging a portion of said one rail and flexurally rigid reference means ridable on the other of said rails and connected to said guide to establish a predetermined reference position of said guide relative to a plane cooperably defined by said rails, a holder for the transducer, means for supportingly mounting said holder from said guide to carry the transducer at a reference position in predetermined geometrical working relationship to and spaced above a portion of the rail other than the portion engaged by said guide, said last named means including means for producing a plurality of different modes of movement of said holder relative to said guide, each mode of movement being centered about said reference position, and separate means for independently actuating said movement producing means to provide any one of said modes of movement.

14. In an ultrasonic rail testing system in which an ultrasonic detector car rides along a pair of rails to progress an ultrasonic transducer over successive portions of one of said rails, a carriage suspended from said car for movement therewith and including a guide engaging a portion of said one rail and flexurally rigid reference means ridable on the other of said rails and connected to said guide to establish a predetermined reference position of said guide relative to a plane cooperably defined by said rails, a holder for the transducer, means for supportingly mounting said holder from said guide to carry the transducer at a reference position in predetermined geometrical working relationship to and spaced above a portion of the rail other than the portion engaged by said guide, said last named means including first means for producing swinging movement of the holder about an axis parallel to the general longitudinal direction of the rail and second means for producing horizontal shifting movement of the holder in a direction generally laterally of the lengthwise direction of the rail, and separate means for independently actuating said first means and said second means, respectively, to move said holder through either or both types of movement.

15. In a system of the class described, means for mounting a signal-sending and receiving transducing means at a reference position in predetermined geometrical working relationship with a region of a medium, means for applying successive ultrasonic test signals in predetermined timed relation to said transducer means to produce corresponding successive mechanical vibrational signals, means for coupling said mechanical vibrational signals from said transducer means to said medium for producing reflected signals from a reflection surface of said medium, actuating means for moving the transducing means in opposite directions from the reference position, each of said opposite directions of movement producing similar changes in said working relationship, cyclically operable drive means connected to said actuating means for periodically moving said transducing means to limit positions in said opposite directions of its movement, comparison means responsive to the strength of the received signals at the opposite limits of movement to produce a signal representative of changes in said working relationship resulting from such mode of movement, and positioning means responsive to the signal from said comparison means and connected to said actuating means for adjusting the reference position of the transducing means about said reference position.

16. For use with an ultrasonic detector car adapted to progress ultrasonic testing apparatus over successive portions of a track rail, said apparatus including sending and receiving transducer means producing successive mechanical vibrational test signals in predetermined timed relation, means for coupling said mechanical vibrational signals from said transducer means to send each signal through the running surface and web of the rail towards the base surface of said rail and to receive a reflection of each signal from said base surface; the combination of means carried on said car for suspending guide structure to ride on said rail and establish a predetermined reference position relative thereto, a holder for said transducer means, means for supportingly mounting said holder from said guide structure to carry the transducer means at a reference position in predetermined geometrical working relationship to and spaced a selected distance above a portion of the running surface of the rail, first and second motion producing means for providing first and second different modes of movement, respectively, of said transducer means relative to said guide structure, each of which modes of movement is centered about said reference position and tends, in response to movement in either direction from said reference position, to produce similar changes in said predetermined working relationship between said transducer means and said rail, independent first and second control means for actuating said first and second motion producing means, respectively, for independently positioning said transducer means relative to said guide structure, and means including first automatic positioning means responsive to changes in the strength of the received signals at the opposite limits of said first mode of movement to detect changes in said working relationship resulting from such first mode of movement and connected to said first control means for causing the same to proportionally change the reference position of said transducer means relative to said base surface, and second automatic positioning means responsive to changes in the strength of the received signals at the opposite limits of said second mode of movement to detect changes in said working relationship resulting therefrom and connected to said second control means for causing the same to proportionally change the reference position of said transducer means relative to said base surface.

References Cited in the file of this patent

UNITED STATES PATENTS

| | | |
|---|---|---|
| 2,545,101 | Meunier | Mar. 13, 1951 |
| 2,592,135 | Firestone | Apr. 8, 1952 |
| 2,618,968 | McConnell | Nov. 25, 1952 |
| 2,672,753 | Drake | Mar. 23, 1954 |
| 2,678,559 | Drake | May 18, 1954 |
| 2,751,783 | Erdman | June 26, 1956 |
| 2,852,707 | Kaehms | Sept. 16, 1958 |